(12) United States Patent
Hung et al.

(10) Patent No.: US 9,760,231 B2
(45) Date of Patent: Sep. 12, 2017

(54) IN-CELL TOUCH DISPLAY DEVICE AND DRIVING METHOD THEREOF

(71) Applicant: MStar Semiconductor, Inc., Hsinchu Hsien (TW)

(72) Inventors: Guo-Kiang Hung, Hsinchu County (TW); Chi Kang Liu, Hsinchu County (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 122 days.

(21) Appl. No.: 14/874,738

(22) Filed: Oct. 5, 2015

(65) Prior Publication Data

US 2016/0109992 A1  Apr. 21, 2016

Related U.S. Application Data

(60) Provisional application No. 62/065,021, filed on Oct. 17, 2014.

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01); *G06F 3/0416* (2013.01); *G06F 2203/04112* (2013.01)

(58) Field of Classification Search
None
See application file for complete search history.

(56) References Cited

U.S. PATENT DOCUMENTS

2008/0309627 A1\* 12/2008 Hotelling .......... G02F 1/134363
345/173
2015/0177880 A1\* 6/2015 Shin ..................... G06F 3/0412
345/174

FOREIGN PATENT DOCUMENTS

TW 201428572 7/2014

\* cited by examiner

*Primary Examiner* — Nicholas Lee
(74) *Attorney, Agent, or Firm* — WPAT, PC

(57) ABSTRACT

An in-cell touch display device includes a first substrate, a plurality of common lines and a plurality of data lines. The common lines are disposed on the first substrate and extend along a first direction. The data lines are disposed on the first substrate and extend along a second direction. The common lines intersect and are insulated from the data lines. A plurality of touch sensing capacitors are formed at intersections of the common lines and the data lines to perform touch sensing.

16 Claims, 7 Drawing Sheets

IN-CELL TOUCH DISPLAY DEVICE AND DRIVING METHOD THEREOF

This application claims the benefit of U.S. Provisional Application Ser. No. 62/065,021, filed Oct. 17, 2014, the subject matter of which is incorporated herein by reference.

BACKGROUND OF THE INVENTION

Field of the Invention

The invention relates in general to a touch display device and a driving method thereof, and more particularly to a touch display device that performs touch sensing using intersected data lines and common lines in a display panel, and a driving method thereof.

Description of the Related Art

Touch sensing technologies have been developed at a fast pace in the recently years. There are numerous consumer electronic products supporting a touch function commercially available. In such type of products, a region of an original display panel is assigned with a touch sensing function, i.e., an original simple display panel is converted to a touch display panel that supports a touch recognition function. According to different structural designs, touch display panels may be categorized into out-cell and in-cell (or on-cell) touch display panels. In general, an in-cell touch display panels has an enhanced thinning effect. However, due to additional touch elements and corresponding production processes for the original display panel, the manufacturing yield rate is likely undesirably affected. In another conventional solution, intersected gate lines and data lines in an original display panel are utilized to perform touch sensing. However, in the above solution, due to a larger overlapping region between the gate lines (and the connected gate electrodes) and the data lines (and the connected source electrodes) and a possible semiconductor layer disposed in between, an excessively large background capacitance is easily caused, hence disfavoring the measurement of the capacitance change and further degrading the touch sensitivity.

SUMMARY OF THE INVENTION

It is a primary object of the present invention to provide an in-cell touch display device and a driving method thereof. By performing touch sensing with intersected data lines and common lines, the in-cell touch display device and the driving method thereof of the present invention achieve a simplified structure as well as enhanced integration of touch control and display functions.

To achieve the above object, the present invention provides an in-cell touch display device including a first substrate, a plurality of common lines and a plurality of data lines. The common lines are disposed on the first substrate, and extend along a first direction. The data lines are disposed on the first substrate, extend along a second direction, and intersect and are insulated from the common lines. A plurality of touch sensing capacitors are formed at intersections of the common lines and the data lines to perform touch sensing.

To achieve the above object, the present invention further provides a driving method for an in-cell touch display device. The in-cell touch display device includes a plurality of common lines extending along a first direction, and a plurality of data lines extending along a second direction. The driving method includes steps of: in a driving mode, transmitting display data on at least one of the data lines, and providing a common voltage to at least one of the common lines; in a touch sensing mode, transmitting a first touch signal on at the least one of the data lines, and transmitting a second touch signal on at the least one of the common lines.

In the in-cell touch display device and the driving method thereof of the present invention, as the touch sensing elements are formed by intersected data lines and common lines in a common display panel, a simplified structure and a thinning effect are achieved. With a relatively smaller overlapping region between the common lines and the data lines, the background capacitance value is smaller and a ratio of the capacitance value contributed by a sensed object is greater. Therefore, with an appropriately designed background capacitance value, the touch sensing accuracy can be enhanced. Further, in the present invention, connection statuses of display control elements and touch control elements are switched through disposing switching elements, and a corresponding constant voltage is provided, thereby preventing interferences between display signals and touch signals.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
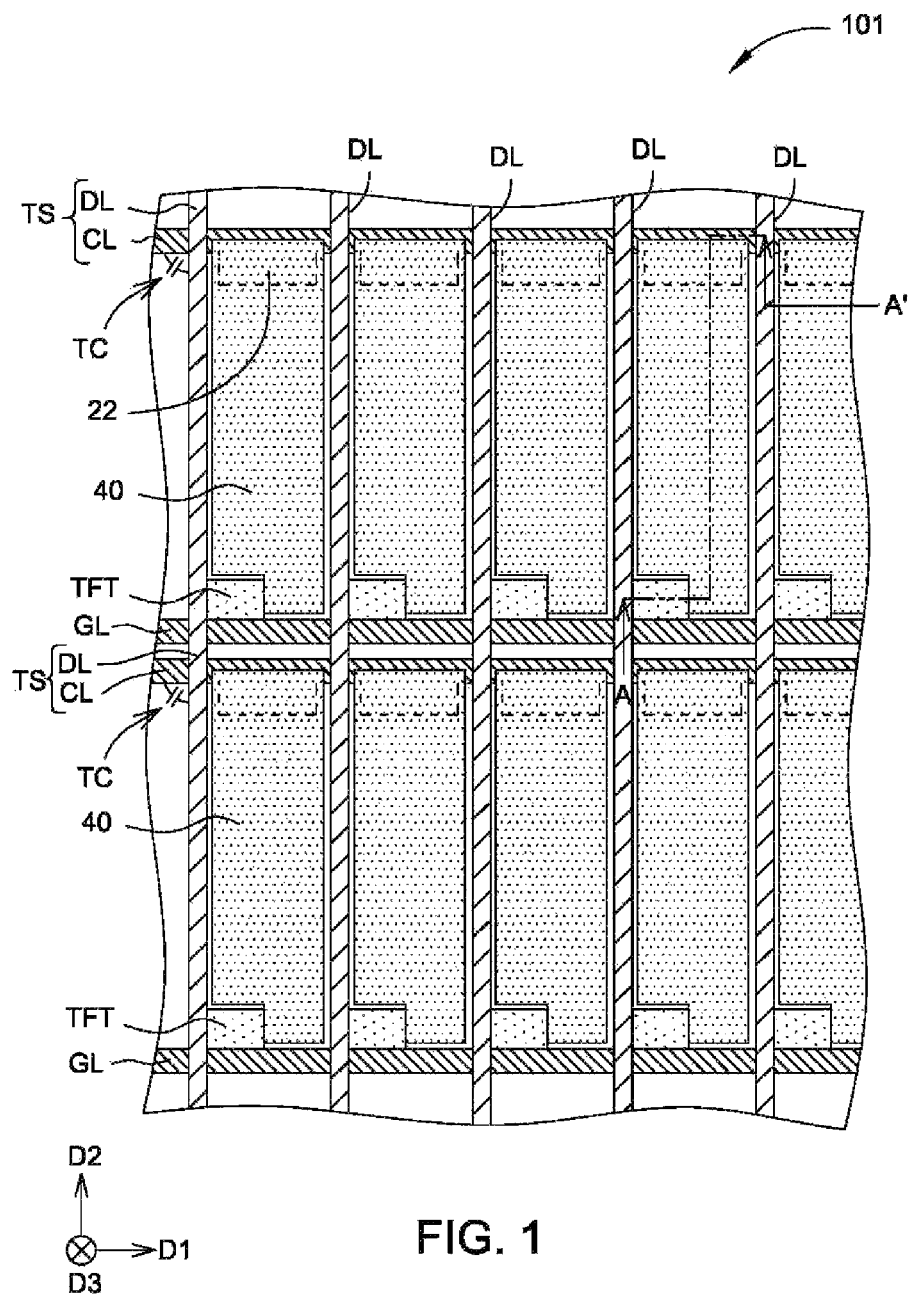
FIG. 1 is a schematic diagram of an in-cell touch display device according to a first embodiment of the present invention.

FIG. 1 to FIG. 4 show a schematic diagram, a section view and circuit diagrams of two different modes of an in-cell touch display device according to a first embodiment of the present invention, respectively. An in-cell touch display device 101 of the embodiment includes a first substrate 11, a second substrate 12, a liquid crystal layer 13, a plurality of data lines DL, a plurality of common lines CL, a plurality of gate lines GL, a plurality of first switching elements SW1, a plurality of second switching elements SW2, a first touch control element 92A, a second touch control element 92B, a display control element 91, and a common voltage source 93. The first substrate 11 has a first inner surface 11A and a first outer surface 11B. The second substrate 12 is disposed opposite the first substrate 11, and has a second inner surface 12A and a second outer surface 12B. The first inner surface 11A and the second inner surface 12A face each other. The liquid crystal layer 13 is disposed between the first substrate 11 and the second substrate 12. The common lines CL are disposed on the first inner surface 11A of the first substrate 11 and extend along a first direction D1. The data lines DL are disposed on the first inner surface 11A of the first substrate 11 and extend along a second direction D2 different from the first direction D1. The common lines CL intersect and are insulated from the data lines DL. Through the common lines CL and the data lines DL as touch sensors TS as well as touch sensing capacitors TC formed by capacitance coupling at intersections of the common lines CL and the data lines DL, capacitive touch sensing operations can be performed.

In the embodiment, for example, the first direction D1 is preferably orthogonal to the second direction D2. The gate lines GL are disposed on the first inner surface 11A of the first substrate 11, extend along the first direction D1, and intersect with the data lines DL. In other words, the gate lines GL may be parallel to the common lines CL, for example. In other embodiments of the present invention, the gate lines GL and the common lines CL may not be parallel according to actual requirements.

Each of the first switching elements SW1 is electrically connected to one data line DL, and selectively switches and electrically couples the data line DL to the display control element 91 or the first touch control element 92A. Each of the second switching elements SW2 is electrically connected to at least one of the common lines CL, and selectively switches and electrically couples the common line CL to the common voltage source 93 or the second touch control element 92B. The first switching elements SW1 and the second switching elements SW2 may be disposed on the first substrate 11 according to actual requirements, and may be formed together with the transistors on the first substrate 11 through a same manufacturing process, for example, to achieve a simplified manufacturing process. In another embodiment, according to actual requirements, the first switching elements SW1 and/or the second switching elements SW2 may be integrated in other display and/or touch integration elements or circuits.

Figure 2:
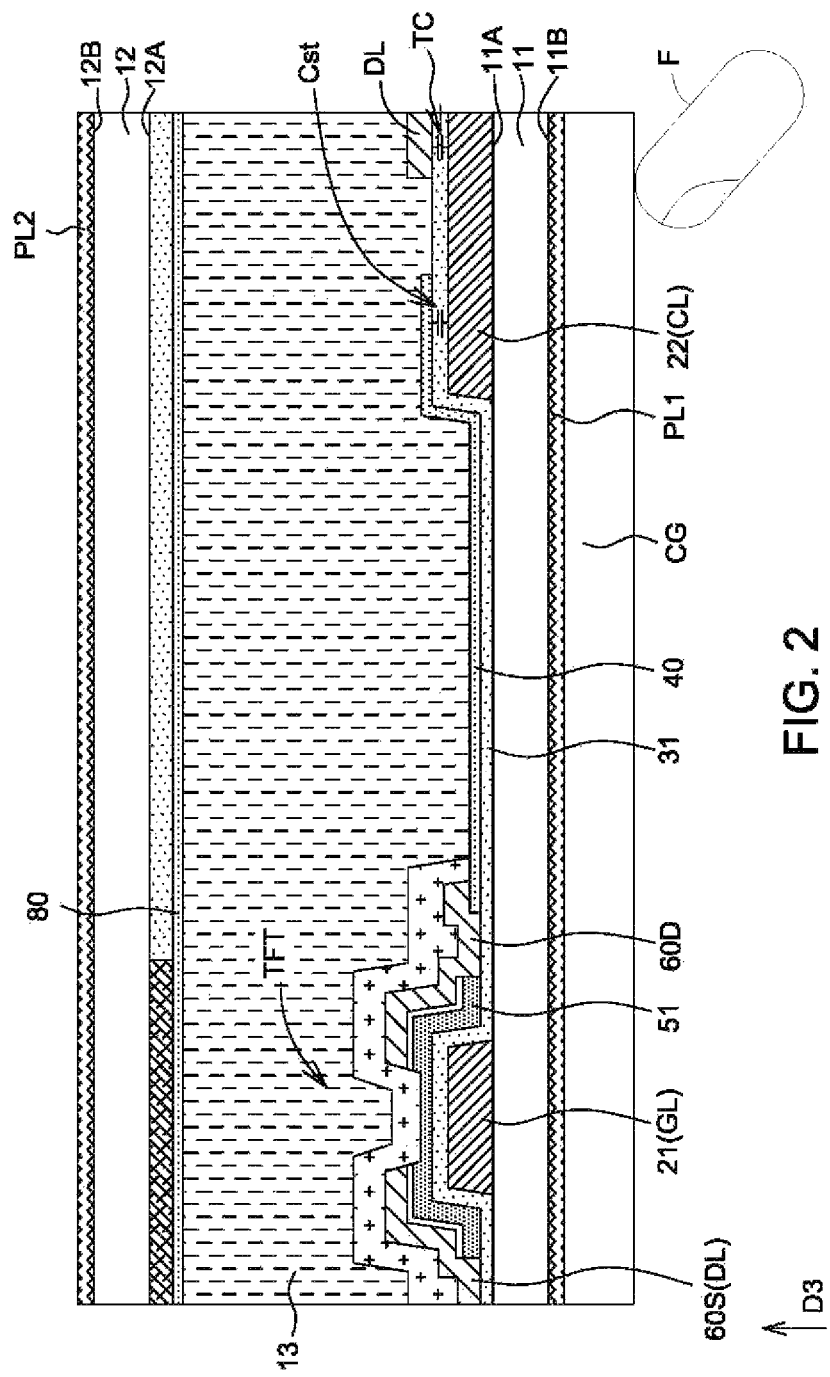
FIG. 2 is a section view along A-A' in FIG. 1.

As shown in FIG. 1 and FIG. 2, the in-cell touch display device 101 of the embodiment may further include a plurality of transistors TFT, a plurality of pixel electrodes 40, and a first dielectric layer 31 disposed on the first inner surface 11A of the first substrate 11. Each of the transistors TFT include a gate 21, a source 60S and a drain 60D. Each of the gates 21 is electrically connected to one gate line GL, and each of the sources 60S is electrically connected to one data line DL. Each of the pixel electrodes 40 is electrically connected to one drain 60D, and the first dielectric layer 31 is clamped between the corresponding common electrode 40 and common line CL in a perpendicular projection direction D3. Each of the pixel electrodes 40, each of the common lines CL and the first dielectric layer 31 clamped between the two form a storage capacitor Cst. The perpendicular projection direction D3 is orthogonal to surfaces of the first substrate 11 and the second substrate 12, for example. It should be noted that, each of the common lines CL may include a protruding electrode portions 22 that overlaps with the pixel electrode 40, for example. As such, without increasing an overlapping area of the common lines CL and the data lines DL, the capacitance of the storage capacitor Cst can be increased.

In the embodiment, for example, the gates 21, the gate lines GL and the common lines CL may be formed by a same patterned metal layer (commonly referred to as metal 1), and so the gates 21 and the gate lines GL may be directly connected. For example, the sources 60S, the drains 60D and the data lines DL may be formed by another patterned metal layer (commonly referred to as metal 2), and so the sources 60S and the data lines DL may be directly connected. Further, in the embodiment, the first dielectric layer 31 is partly disposed between the gates 21 and a semiconductor layer 51. Thus, in the embodiment, for example, the first dielectric layer 31 may be regarded as a gate dielectric layer. In the embodiment, for example, the gates 21, the first dielectric layer 31, the semiconductor layer 51, and the sources 60S/drains 60D are sequentially stacked on the first substrate 11. Therefore, each of the transistors TFT of the embodiment may be regarded as a bottom gate transistor.

In the present invention, preferably, the liquid crystal layer 13 is a twisted nematic (TN) liquid crystal particle, for example. Further, a first polarization sheet PL1 and a second polarization sheet PL2 may be disposed on the first outer surface 11B of the first substrate 11 and the second outer surface 12B of the second substrate 12, respectively. As the touch display device 101 of the present invention performs touch sensing through the touch sensors TS formed by the data lines DL and the common lines CL disposed on the first inner surface 11A, one side that forms the first outer surface 11B of the first substrate 11 of the embodiment is preferably a touch operation surface to accordingly prevent possible effects from the common electrodes 80 during touch operations. When a touching object such as a finger F touches the first outer surface 11B, by analyzing changes in the capacitors TC formed by the data lines DL and the common lines CL, an object of touch positioning can be achieved. Further, for example, the in-cell touch display device 101 of the embodiment may include a cover glass CG disposed on one side of the first outer surface 11B of the first substrate 11 to further achieve a protection effect during touch operations.

Figure 3:
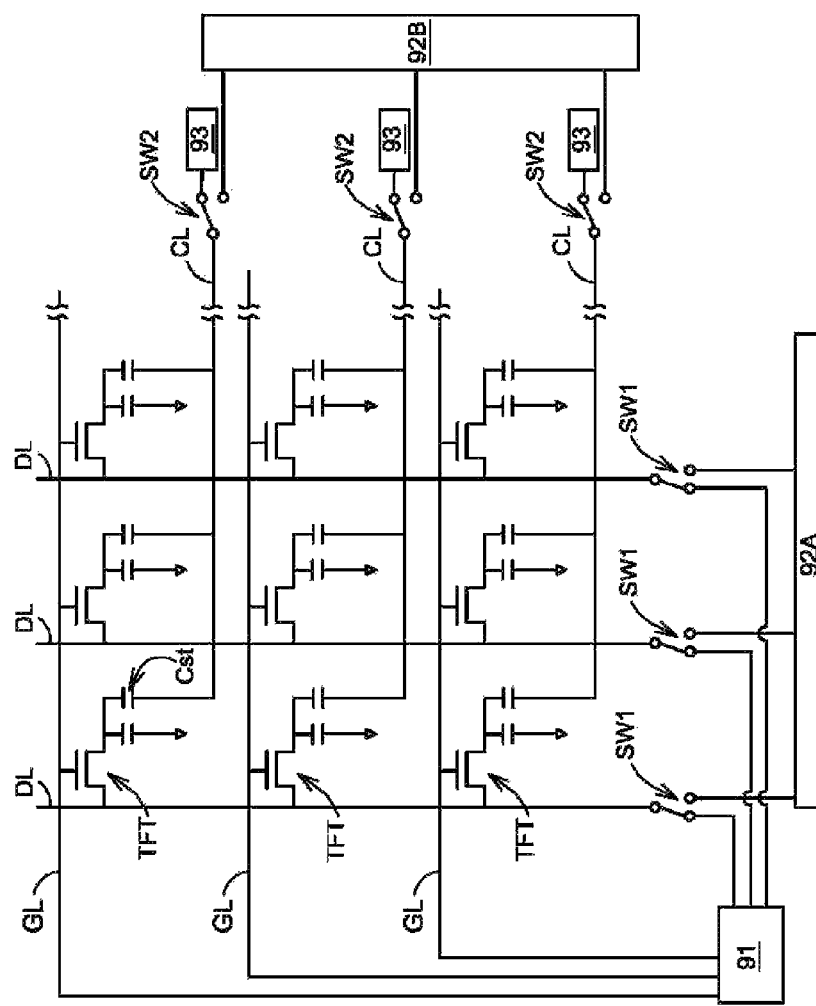
FIG. 3 is a circuit diagram of an in-cell touch display device in a display driving mode according to the first embodiment of the present invention.
Figure 5:
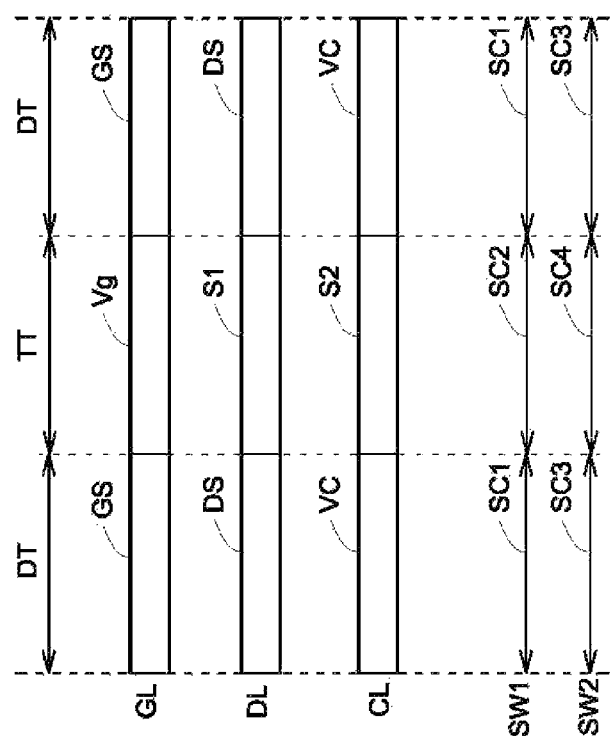
FIG. 5 is a timing diagram of driving signals according to the first embodiment of the present invention.

FIG. 3 and FIG. 5 show a circuit diagram of the in-cell touch display device 101 operating in a display driving mode and a timing diagram of corresponding driving signals according to the embodiment, respectively. When the in-cell touch display device 101 operates in a display driving mode DT, display data DS is transmitted on the data lines DL, and turn on the transistors TFT through the corresponding gate lines GL to refresh a display image. Further, the common lines CL corresponding to the gate lines GL are electrically coupled to a common voltage 93, so as to utilize a common voltage VC as a reference voltage for image display.

Figure 4:
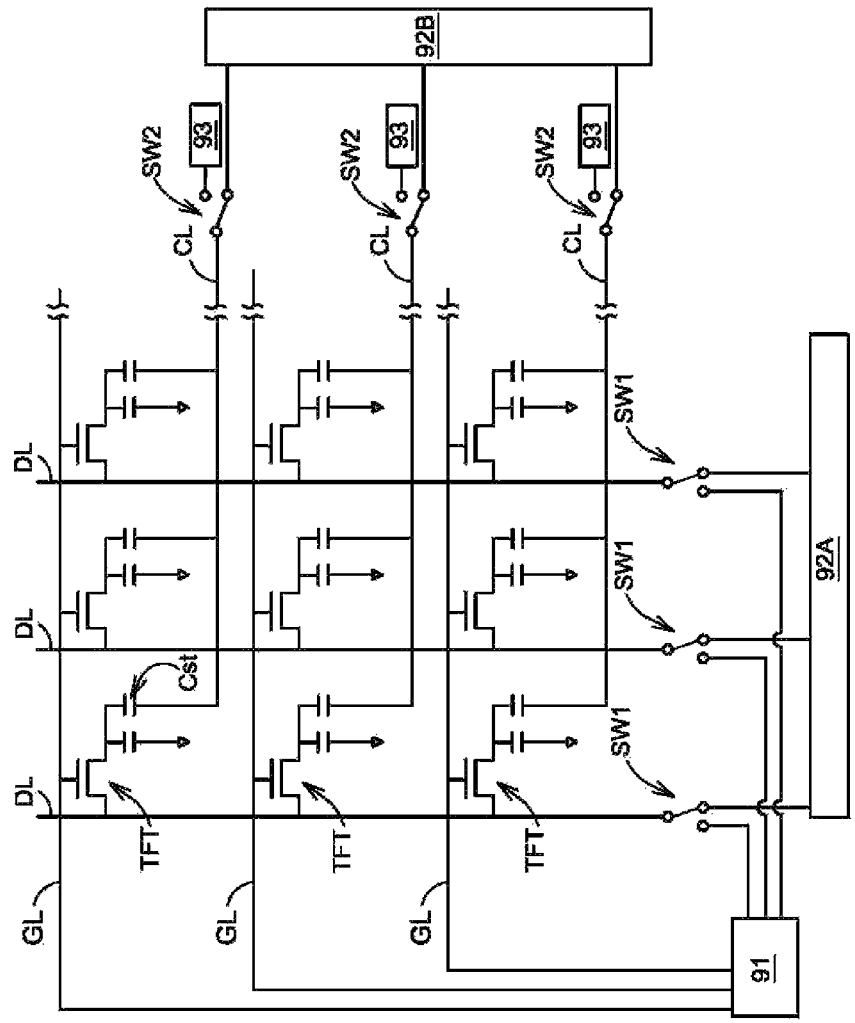
FIG. 4 is a circuit diagram of an in-cell touch display device in a touch sensing mode according to the first embodiment of the present invention.

FIG. 4 and FIG. 5 show a circuit diagram of the touch display device 101 operating in a touch sensing mode and a timing diagram of corresponding driving signals according to the embodiment, respectively. When the in-cell touch display device 101 operates in a touch sensing mode TT, a first touch signal S1 and a second touch signal S2 are respectively transmitted on the data lines DL and the common lines CL, and touch sensing is then performed through the coupling capacitances sensed by the touch sensing capacitors TC at the intersections. For example, the first touch signal S1 may be a touch driving signal, i.e., a touch driving signal is transmitted via the data lines DL; the coupling capacitance is sensed by the touch sensing capacitor TC at the corresponding intersection to further generate a touch sensing signal at the common line CL, i.e., the second touch signal S2 transmitted on the common line CL is the corresponding touch sensing signal.

Further, in the embodiment in FIG. 3 to FIG. 5, the switching of the data lines DL is performed through the first switching elements SW1 to switch the electrical coupling of the data lines DL to the display control element 91 and the first touch control element 92A; the switching of the common lines CL is performed through the second switching elements SW2 to switch the electrical coupling of the common lines CL to the common voltage source 93 and the second touch control element 92B. More specifically, in the embodiment, in the display driving mode DT, the first switching elements SW1 are switched to a first switching status SC1 to electrically couple to the corresponding data lines DL and the display control element 91; on the other hand, the second switching elements SW2 at this point are switched to a third switching status SC3 to electrically couple to the corresponding common lines CL and the common voltage source 93. Further, in the touch sensing mode TT, the first switching elements SW1 are switched to a second switching status SC2 to electrically couple to the corresponding data lines DL and the first touch control element 92A; on the other hand, the second switching elements SW2 at this point are switched to a fourth switching status SC4 to electrically couple to the corresponding common lines CL and the second touch control element 92B. It should be noted that, the switching relationships are not limited to the examples above, and may be correspondingly adjusted according to actual requirements. For example, when the display element 91, the first touch control element 92A, the second touch control element 92B and the common voltage source 93 are integrated into one integrated circuit, corresponding signals may be transmitted in the corresponding display driving mode or touch sensing mode through appropriate designs to achieve signal switching relationships without involving switching elements. In another embodiment, the first touch control element 92A and the second touch control element 92B may also be integrated in an integrated circuit, and the data lines DL and the common lines CL are both electrically coupled to the integrated circuit through the first switching elements SW1 and the second switching elements SW2 in the touch sensing mode TT.

In the embodiment in FIG. 3 to FIG. 5, when the in-cell touch display device 101 operates in the display driving mode DT, the gate lines GT transmit a display gate signal GS for turning on the corresponding transistors TFT to refresh a display image. However, when the in-cell touch display device 101 operates in the touch sensing mode TT, the gate lines GL may selectively electrically couple to a constant voltage Vg. In an embodiment, the constant voltage Vg may be a ground voltage, and the transistors TFT of the in-cell touch display device 101 are then in a turned off state to prevent from causing an unsatisfactory display image. Further, by providing a stable constant voltage, noises of the data lines DL and the common lines CL during touch sensing operations can be reduced. In another embodiment, the constant voltage Vg may be greater than the turn-on voltage of the transistors TFT, and the transistors TFT of the touch display device 101 are correspondingly in a turned on state. To prevent from causing an unsatisfactory display image, the operating frequency of the touch sensing mode TT needs to be greater than the frequency resonance of the liquid crystal particles. That is, when the in-cell touch display device 101 operates in the touch sensing mode TT, a constant voltage Vg greater than the turn-on voltage of the transistors TFT may be provided to the corresponding gate lines GL to reduce noises of the data lines DL and the common lines CL during touch sensing operations. Further, before the liquid crystal particles corresponding to the transistor TFT generate a display response, the corresponding display data corresponding to the transistor TFT may be restored the display data that is before the constant voltage Vg turns on the transistor TFT, or the display data of the transistor TFT may be updated to another set of display data of a next time point, thereby preventing from causing an unsatisfactory image. The power supply and switching relationships of the gate lines GL are not limited to the above examples, and the touch display device 101 may be controlled in a time division or area division manner according to actual requirements.

In the embodiment, in the touch sensing mode, the first touch control element 92A and the second touch control element 92B may be a touch signal driving element or a touch signal receiving element, respectively. When the first touch control element 92A is a touch signal driving element, the first touch signal S1 may be a touch driving signal, and the first touch control element 92A may be utilized to transmit the first touch signal S1 to the data lines DL. At this point, the second touch signal control element 92B may be a touch signal receiving element, the second touch signal S2 may be a touch sensing signal, and the second touch signal control element 92B may be utilized to receive the second touch signal S2 sensed by the corresponding common lines CL. The relationships of the touch driving and touch receiving operations may be adjusted according to actual requirements and are not limited to the foregoing embodiment.

Figure 6:
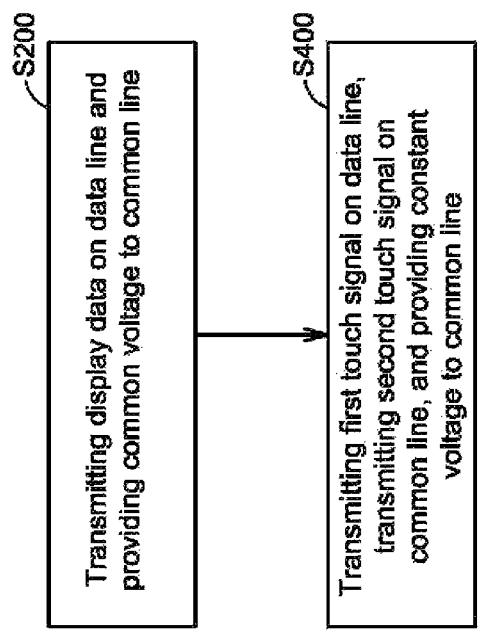
FIG. 6 is a flowchart of a signal driving method of an in-cell touch display device of the present invention.

FIG. 6 shows a flowchart of a signal driving method of an in-cell touch display device of the present invention. The signal driving method of an in-cell touch display device provided by the present invention is applicable to the in-cell touch display device disclosed in FIG. 1 to FIG. 5. In step S200, in the display driving mode DT, display data is transmitted to the data line DL corresponding to the transistor TFT of the display pixel whose display data is to be refreshed, and the common voltage VC is provided to the common line CL corresponding to the transistor TFT of the display pixel whose display data is to be refreshed. In practice, by electrically coupling the data line DL to the display control element 91 via the first switch element SW1, the display control element 91 may transmit the display data to the data line DL via the first switching element SW1; by electrically coupling the common line CL to the common voltage source 93 via the second switching element SW2, the common voltage source 93 is allowed to provide the common voltage VC to the common line CL via the second switching element SW2. In step 400, in the touch sensing mode, a first touch signal S1 is transmitted on at least one data line DL, a second touch signal S2 is transmitted on at least one common line CL, and a constant voltage Vg is provided to at least one gate line GL. In practice, by electrically coupling the data line DL to at least one first touch control element 92A via the first switching element SW1, the first touch control element 92A may transmit the first touch signal S1 to the data line DL via the first switching element SW1; by electrically coupling the common line CL to a second touch control element 92B via the second switching element SW2, the second touch control element 92B is allowed to transmit the second touch signal S2 to the common line CL via the second switching element SW2. It should be noted that, when the touch display device 101 of the present invention operates in the touch sensing mode TT, the constant voltage Vg provided to the gate lines GL may be a ground voltage or another constant voltage. The associated principles are as described previously and shall be omitted herein.

Figure 7:
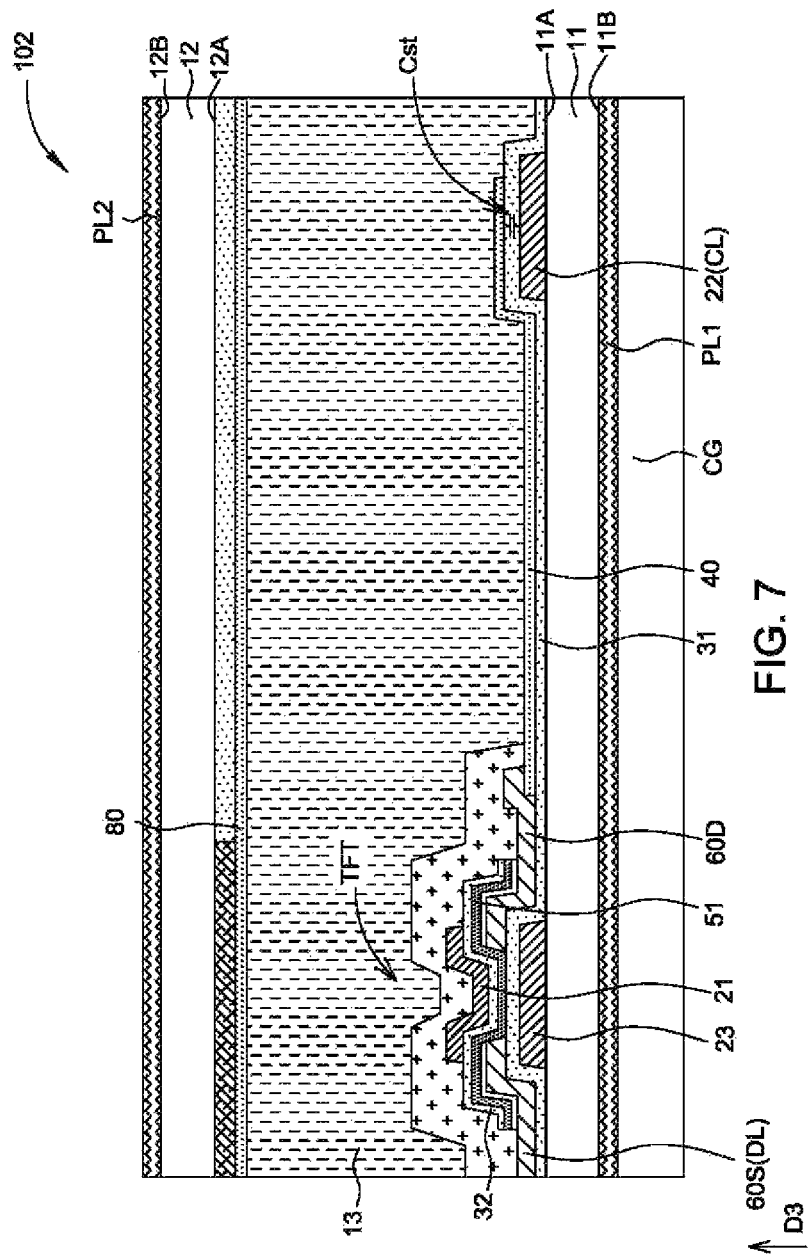
FIG. 7 is a schematic diagram of an in-cell touch display device according to a second embodiment of the present invention.

Referring to FIG. 7, a difference of the embodiment in FIG. 7 from the first embodiment is that, in a touch display device 102 of the embodiment, each of the transistors TFT may be a top gate transistor and include a second dielectric layer 32 disposed between the semiconductor layer 51 and the gate 21. Further, the touch display device 102 may further include a light shielding layer 23 disposed between the first substrate 11 and the transistors TFT. The light shielding layer 23 is utilized to shield light from one side of the first substrate 11 from illuminating the transistors TFT, which may affect electrical characteristics. For example, the light shielding layer 23 and the common lines CL may be formed by the same patterned metal layer. It should be noted that, structures of the transistors TFT and the light shielding layer 23 may be applied to the foregoing embodiments according to actual requirements.

In conclusion, in the in-cell touch display device and the driving method thereof of the present invention, as the touch sensing elements are formed by intersected data lines and common lines, a simplified structure and a thinning effect are achieved. With a relatively smaller overlapping region between the common lines and the data lines, the background capacitance value is smaller and a ratio of the capacitance value contributed by a sensed object is greater. Therefore, with an appropriately designed background capacitance value, the touch sensing accuracy can be enhanced. Further, in the present invention, connection statuses of display control elements and touch control elements are switched through disposing switching elements, and a corresponding constant voltage is provided, thereby preventing interferences between display signals and touch signals.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An in-cell touch display device, comprising:
    a first substrate;
    a pixel electrode, disposed on the first substrate;
    a common line, disposed on the first substrate extending along a first direction, said common line comprising a protruding electrode portion overlapping said pixel electrode; and
    a data line, disposed on the first substrate extending along a second direction different from said first direction and insulated from the common line,
    wherein a touch sensing capacitance is formed between the common line and the data lines.

2. The in-cell touch display device according to claim 1, wherein in a display driving mode, the data line is utilized to transmit display data, and the common line is utilized to provide a common voltage.

3. The in-cell touch display device according to claim 2, wherein the data line is electrically coupled to a display control element via a first switching element, and the common line is electrically coupled to a common voltage source via a second switching element.

4. The in-cell touch display device according to claim 1, wherein in a touch sensing mode the data line is utilized to transmit a first touch signal, and the common line is utilized to transmit a second touch signal.

5. The in-cell touch display device according to claim 4, wherein the data line is electrically coupled to a first touch control element via a first switching element, and the common line is electrically coupled to a second touch control element via a second switching element.

6. The in-cell touch display device according to claim 5, wherein the first touch control element is a touch signal driving element, the first touch signal is a touch driving signal, and the first touch control element transmits the first touch signal to the data line; the second touch control element is a touch signal receiving element, the second touch signal is a touch sensing signal, and the second touch control element receives the second touch signal.

7. The in-cell touch display device according to claim 5, wherein the second touch control element is a touch signal driving element, the second touch signal is a touch driving signal, and the second touch control element is utilized to transmit the second touch signal to the common line; the first touch control element is a touch signal receiving element, the first touch signal is a touch sensing signal, and the first touch control element receives the first touch signal.

8. The in-cell touch display device according to claim 1, further comprising:
    a transistor; and
    a gate line, disposed on the first substrate extending along the first direction, coupled to the transistor;
    wherein in a touch sensing mode, the data line is utilized to transmit a first touch signal, the common line is utilized to transmit a second touch signal, and the gate line is coupled to a constant voltage.

9. The in-cell touch display device according to claim 8, wherein the constant voltage is a ground voltage.

10. The in-cell touch display device according to claim 8, wherein the constant voltage is greater than a turn-on voltage of the transistors.

11. A driving method for an in-cell touch display device, the in-cell touch display device comprising a common line extending along a first direction and a data line extending along a second direction, the driving method comprising:
    driving a display mode, comprising:
        transmitting display data on the data line; and
        providing a common voltage to the common line; and
    driving a touch sensing mode, comprising:
        transmitting a first touch signal on the data line;
        transmitting a second touch signal on the common line; and
        locating a touch based on a capacitance change between said data line and said common line,
        wherein the first touch signal and the second touch signal are touch driving signal and touch sensing signal respectively or vise versa.

12. The driving method according to claim 11, wherein driving the display mode further comprises:
    electrically coupling the data line to a display control element to receive the display data; and
    electrically coupling the common lines to a common voltage.

13. The driving method according to claim 11, wherein driving the touch sensing mode further comprises:
    electrically coupling the data line to a first touch control element; and
    electrically coupling the common line to a second touch control element.

14. The driving method according to claim 11, wherein the in-cell touch display device further comprises a gate line extending along said first direction, and driving the touch sensing mode further comprises:
    providing a constant voltage to the gate line.

15. The driving method according to claim 14, wherein the constant voltage is a ground voltage.

16. The driving method according to claim 14, wherein the in-cell touch display device further comprises a transistor, the gate line is coupled to the transistor, and the constant voltage is greater than a turn-on voltage of the transistor.

* * * * *